United States Patent [19]
Herben et al.

[11] Patent Number: 5,956,995
[45] Date of Patent: Sep. 28, 1999

[54] LUBRICANT LEVEL DETECTION SYSTEM FOR SEALED MUD MOTOR BEARING ASSEMBLY

[75] Inventors: William C. Herben; Tuong T. Le; Gunther von Gynz-Rekowski, all of Houston, Tex.

[73] Assignee: Pegasus Drilling Technologies, L.L.C., Houston, Tex.

[21] Appl. No.: 08/932,879

[22] Filed: Sep. 18, 1997

[51] Int. Cl.[6] .................................................. G01F 23/30
[52] U.S. Cl. ............................................................ 73/314
[58] Field of Search ......................... 73/298, 314; 175/45, 175/61; 340/854.4, 855.4, 855.5, 855.8

[56] References Cited

U.S. PATENT DOCUMENTS

| | | | |
|---|---|---|---|
| 4,374,020 | 2/1983 | Trevino et al. | 208/216 R |
| 4,610,319 | 9/1986 | Kalsi | 175/371 |
| 5,195,754 | 3/1993 | Dietle | 272/27 |
| 5,448,227 | 9/1995 | Orban et al. | 340/854.4 |
| 5,467,832 | 11/1995 | Orban et al. | 175/45 |

*Primary Examiner*—William Oen
*Attorney, Agent, or Firm*—Rosenblatt & Redano, P.C.

[57] ABSTRACT

An apparatus and method for detecting lubricant reservoir levels, particularly in bearing sections for downhole mud motors, is revealed. This allows rig personnel to more exactly ascertain the remaining bearing life of the assembly. In one embodiment, the assembly is pulled out of the hole and comprises of a signal source. A hand-held device is placed next to the bearing housing and the location of the strongest signal is a direct measurement of the position of the floating piston in the lubricant reservoir. The rig personnel can then readily obtain a level reading on the fluid level in the reservoir. An alternative design is also revealed where the position of the floating piston is sensed in real-time by receivers mounted at spaced locations in the lubricant reservoir. The position of the floating piston is thus detected by the receivers and sent to the surface, generally through the measurement-while-drilling (MWD) sub, so that rig personnel at the surface known at any given time the position of the floating piston and, thus, the remaining lubricant level in the reservoir. The signal source can be a magnetic component mounted in the bearing housing reservoir area where the surrounding components are nonmagnetic such that the receiver responds to the magnetic field created by the magnetic signal source. The signal source can also be powered by a stored electrical supply which can generate through a signal source a signal which can be measured, either over the air or by a hand-held receiver held by rig personnel, or by a connection to the bearing housing for a direct reading of the signal generated.

17 Claims, 3 Drawing Sheets

LUBRICANT LEVEL DETECTION SYSTEM FOR SEALED MUD MOTOR BEARING ASSEMBLY

FIELD OF THE INVENTION

The field of this invention relates to a method and apparatus for detecting remaining lubricant level In bearing assemblies, particularly useful for downhole motor operations so as to be able to ascertain the remaining useful life of the assembly.

BACKGROUND OF THE INVENTION

Drilling with downhole motors is well-known. A downhole motor assembly generally comprises of the hydraulic power section, a universal joint, and a bearing assembly. The nonsealed bearing assemblies are more and more being replaced by sealed bearing sections. The sealed bearing assembly contains radial bearings to guide the bit with respect to the drillstring and thrust bearings to transmit down-load and up-load thrust. These seal bearing assemblies are placed in housings which are filled with bearing lubricant, which is pressure-balanced to the drilling fluid pressure by virtue of use of pressure-transmitting partitioning devices such as free-floating pistons. As the mud motor assembly operates, the circulating mud acts as a coolant to the lubricant oil which is separated from the circulating mud by the seal assemblies, with the piston acting as the barrier between the lubricant and the circulating mud. By some designs, a certain amount of lubricant passes through the seals during operation. This leakage flow is important to the long-term vitality of the seals, which in turn keep the radial and thrust bearings of the bearing assembly in an oil bath during the drilling operations.

An alternative has been to use drilling mud-lubricated bearings. Because the mud has grit and other solids in it, these bearings were only run about 80–120 hours before the assembly was taken out of service. Wear in these bearings enlarged their clearances around the drive shaft and made the bit difficult to control because of its eccentric movements in enlarged bearing clearances.

In the past, drilling personnel have operated on a rule of thumb where after so many hours of operation on a downhole motor assembly, the assembly was withdrawn from the wellbore and the bearing section disassembled so that the lubricant could be replenished. In general, after approximately 80–120 hours of operation, drillers would pull the drilling motor assembly out of the hole in an effort to ascertain the amount of lubricant remaining. The techniques that were available for actual measurement of the remaining lubricant were either crude and always indirect or, in some sizes, completely not workable. Some of these techniques involved the installation of a pressure gauge once the bearing assembly was out of the hole. The gauge was generally screwed onto a check valve which communicated with the lubricant reservoir. A spring acting on the floating piston would produce a pressure which would be reduced as fluid escaped from the reservoir around the seal. Thus, based on the pressure reading obtained, an indirect measurement of the remaining fluid was obtained.

These devices were generally unavailable in smaller sizes due to space limits which precluded the insertion of a check valve to facilitate the insertion subsequently of a pressure gauge. Even on larger sizes, this technique proved cumbersome, and generally required the removal of the bearing assembly from the rig floor, thereby necessitating additional delays at the drillsite.

Other techniques that were used involve the insertion of a thin rod to, in essence, feel the position of the seal through a small opening available around the drive sub. This technique was only feasible if a compensating piston assembly was used. Again, this technique was unavailable on small sizes and was also inaccurate in determining the true volume of lubricant remaining in the reservoirs around the radial and thrust bearings.

In view of the uncertainties of these indirect techniques in measurement of remaining lubricant, drillers have opted for the replacement technique which involved removal of the downhole motor assembly and a replenishment of the lubricant level after approximately only 80–120 hours of operation. Accordingly, it is the object of the invention to provide improved sensing techniques for the lubricant level in a bearing assembly for a downhole motor drilling assembly so that the level of remaining lubricant can be easily determined by rig personnel at the surface, having removed the assembly from the wellbore, or alternatively, on a real-time basis by sensing the fluid level and transmitting the level remaining information to the surface during the drilling operations. It is estimated that with these improvements to measuring techniques for lubricant levels, the downhole motor assembly can be run continuously in the wellbore for 300 hours and higher prior to removal for a check on the condition of the fluid reservoir level. Of course, other downhole conditions may necessitate the removal of the mud motor drilling assembly earlier. However, it is intended with this invention that rig personnel can reliably continue to operate a downhole motor drilling assembly well over the pre-existing 80–120-hour arbitrary limit as long as the suitable rate of penetration is being maintained. The details of the operation of the apparatus and method will become clear to those of ordinary skill in the art from a review of the detailed description below.

The basics of use of a combination of a floating piston with a seal, coupled with a reservoir in a drilling mud motor seal bearing assembly is described in detail in U.S. Pat. No. 5,195,754. U.S. Pat. No. 4,610,319 also illustrates the use of a hydrodynamic lubricant seal in a drillbit environment.

SUMMARY OF THE INVENTION

An apparatus and method for detecting lubricant reservoir levels, particularly in bearing sections for downhole mud motors, is revealed. This allows rig personnel to more exactly ascertain the remaining bearing life of the assembly. In one embodiment, the assembly is pulled out of the hole and comprises of a signal source. A hand-held device is placed next to the bearing housing and the location of the strongest signal is a direct measurement of the position of the floating piston in the lubricant reservoir. The rig personnel can then readily obtain a level reading on the fluid level in the reservoir. An alternative design is also revealed where the position of the floating piston is sensed in real-time by receivers mounted at spaced locations in the lubricant reservoir. The position of the floating piston is thus detected by the receivers and sent to the surface, generally through the measurement-while-drilling (MWD) sub, so that rig personnel at the surface know at any given time the position of the floating piston and, thus, the remaining lubricant level in the reservoir. The signal source can be a magnetic component mounted in the bearing housing reservoir area where the surrounding components are nonmagnetic such that the receiver responds to the magnetic field created by the magnetic signal source. The signal source can also be powered by a stored electrical supply which can generate through a signal source a signal which can be measured, either over the air or by a hand-held receiver held by rig personnel, or by a connection to the bearing housing for a direct reading of the signal generated.

DETAILED DESCRIPTION OF THE PREFERRED EMBODIMENT

Figure 1:
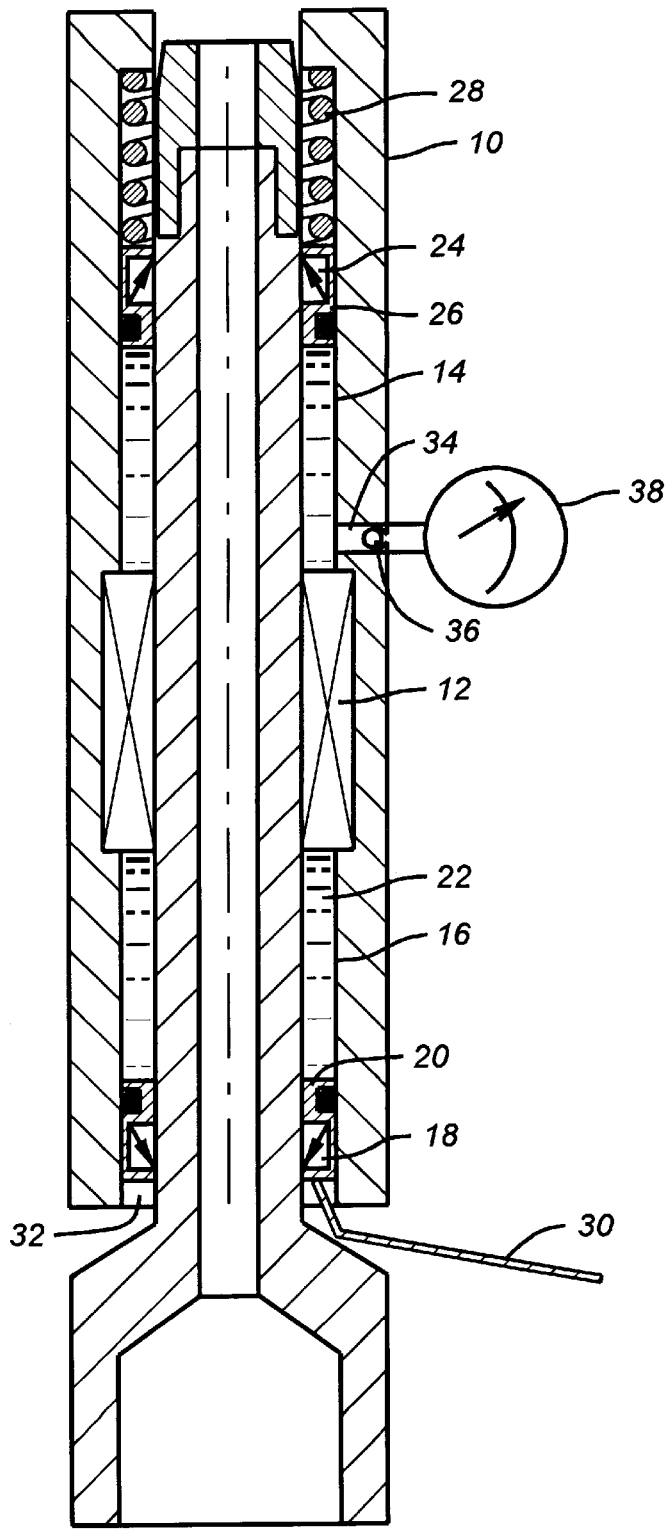
FIG. 1 illustrates two prior art techniques for trying to determine the lubricant level in a reservoir for radial and thrust bearings for a downhole mud motor assembly.

The basic components of a bearing assembly for a downhole motor are schematically illustrated in FIG. 1. A housing 10 contains the thrust and radial bearings 12. The bearings 12 are in communication with upper oil reservoir 14 and lower oil reservoir 16. A lower seal 18 is mounted to a floating piston 20 for compensatory movement in response to thermal or pressure effects as well as loss of the lubricant at the seal 18 during normal operation. The lubricant 22 is contained in the upper and lower reservoirs 14 and 16, respectively. Reservoirs 14 and 16 can be in fluid communication through bearings 12 or they can be separate reservoirs, each lubricating a portion of the bearing assembly 12. Seal 24 is mounted together with piston 26 to close off one end of the upper reservoir 14, while the opposite end of the lower end 16 is closed off by seal 18. In prior designs, such as illustrated in FIG. 1, a spring 28 exerted a predetermined force on the piston 26 which, in turn, bore on seal 24 and, in turn, on the lubricant 22 in both reservoirs 14 and 16 and ultimately against seal 18 via piston 20. During operation, lubricant 22 would, by design, pass around the seals 18 and 24. As the lubricant 22 escaped from the upper and lower reservoirs 14 and 16, the piston 26 would move toward piston 20, thus reducing the volume of reservoir 14 to compensate for the amount of lubricant 22 that flowed out from such reservoirs and into the wellbore. As a result, the position of the piston 20 changed as running time on the assembly increased.

If the reservoirs 14 and 16 are not connected to each other, then the pistons 20 and 26 would move toward each other to compensate for the amount of lubricant 22 that leaked through the seals 18 and 24.

In the past, one of the techniques for determining the amount of lubricant 22 remaining in the reservoirs 14 and 16 was to take a thin rod 30 which was bent to go into opening 32. This procedure was only useful if the reservoirs 14 and 16 were not connected. Depending on how far in the rod 30 went into opening 32, a reading was obtained. The problem with this approach was that in small designs, there wasn't enough room to even insert a rod such as 30, so this technique could not be used. Additionally, even in the larger sizes, the opening 32 on many occasions was completely obstructed with debris from the wellbore, thus blocking the movement of the rod 30 or lending uncertainties as to whether the position of the piston 20 was actually being sensed or whether it was something else. Thus, potentially false readings could be obtained as to the remaining lubricant if, for example, the piston 20 with the seal 18 had moved substantially further yet the rod 30 was contacting solidified debris from the wellbore, which at some point had bridged over the access point 32. Thus, this technique, although available for some sizes, was not generally thought of as being reliable.

Another technique that had been tried is also illustrated in FIG. 1. As shown in FIG. 1, a port 34 has built into it a check valve 36 which is designed to retain the lubricant 22 in the reservoir 14. When the assembly shown in FIG. 1 is removed from the wellbore, a pressure gauge 38 was screwed into the port 34 in such a manner as to deactivate the check valve 36 so that a pressure reading could be obtained. The function of the check valve 36 was akin to a typical tire valve which retains the pressurized fluid yet permits the addition of compressed air for tire inflation. The problem with the pressure gauge technique, also illustrated in FIG. 1, is that in smaller sizes, the housing 10 could not be fabricated of a sufficient thickness to accommodate a check valve such as 36. Thus, this technique was not available on such small sizes. For bigger sizes, generally larger than 3½", the reading obtained on the pressure gauge 38 was, at best, an indirect measurement of the remaining lubricant 22 in the reservoirs 14 and 16. As the lubricant 22 leaked out past the seals 24 and 18, the spring 28 would also expand from its original position. The pressure in the reservoirs 14 and 16 would decline proportionate to the expansion of the spring 28 and, therefore, the movement of the pistons 26 and 20. Even in sizes where the check valve 36 could be provided, the gauge 38 had to be installed without undue pressure loss which would give false readings of the remaining fluid 22 in the reservoirs 14 and 16. When this operation had been attempted in the past, it was generally after the bearing assembly shown in FIG. 1 was taken from the rig floor that a technician with a reliable gauge could attempt to insert it into the port 34 to get the reading. Again, this proved to be inconvenient as well as unreliable and was, therefore, a technique that fell into disuse.

To avoid risking loss of lubricant in the bearing section shown in FIG. 1, the procedure was developed where after so many hours of operation, generally about 80–120, the entire assembly, including the bearing section shown in FIG. 1, would be removed from the wellbore and the bearing section lubricant would be replenished, regardless of what level it was at the moment.

Figure 2:
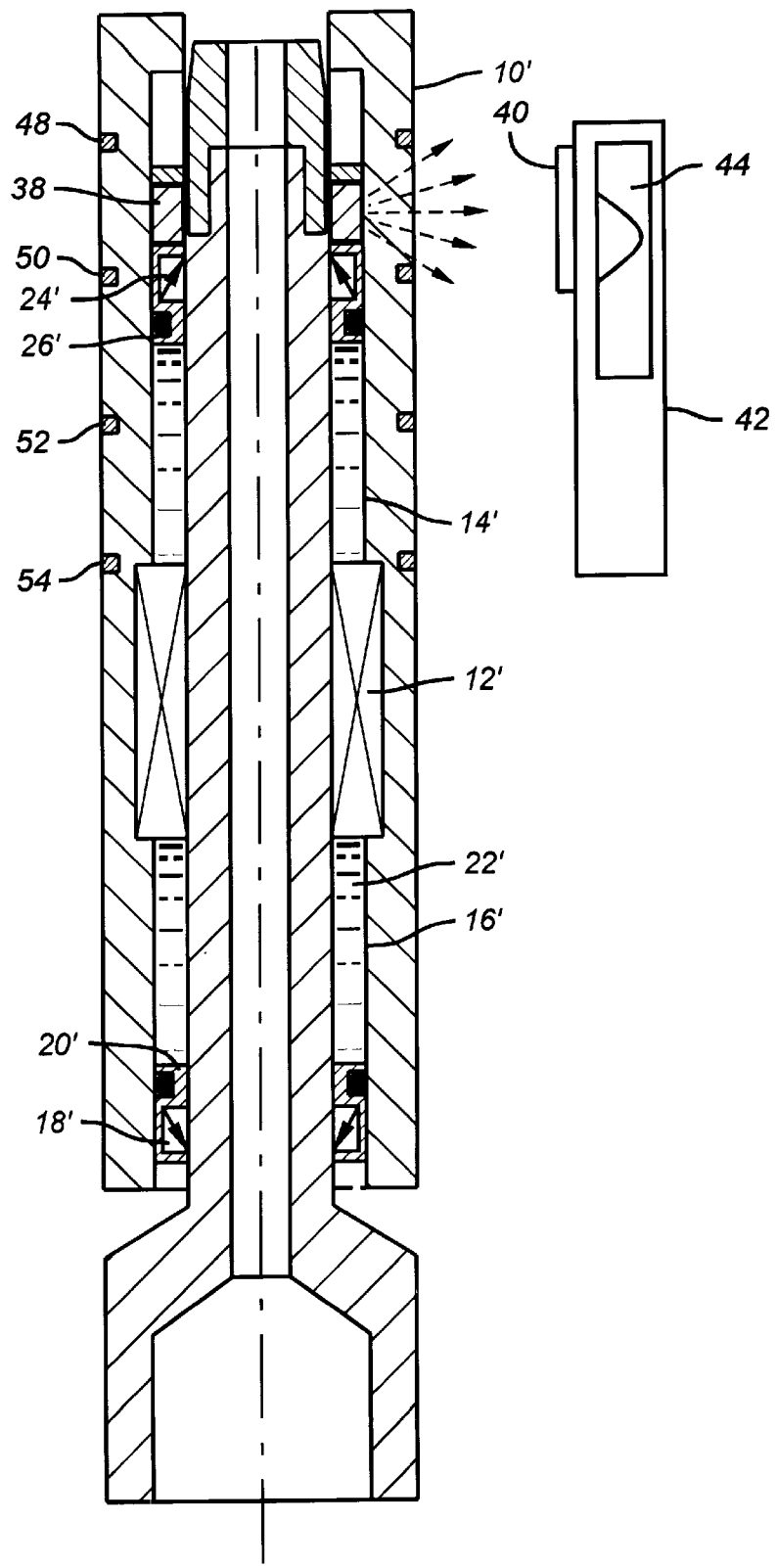
FIG. 2 illustrates the technique of the present invention where the assembly is removed from the wellbore and the level is sensed by a receiver sensing a transmitted signal.
Figure 3:
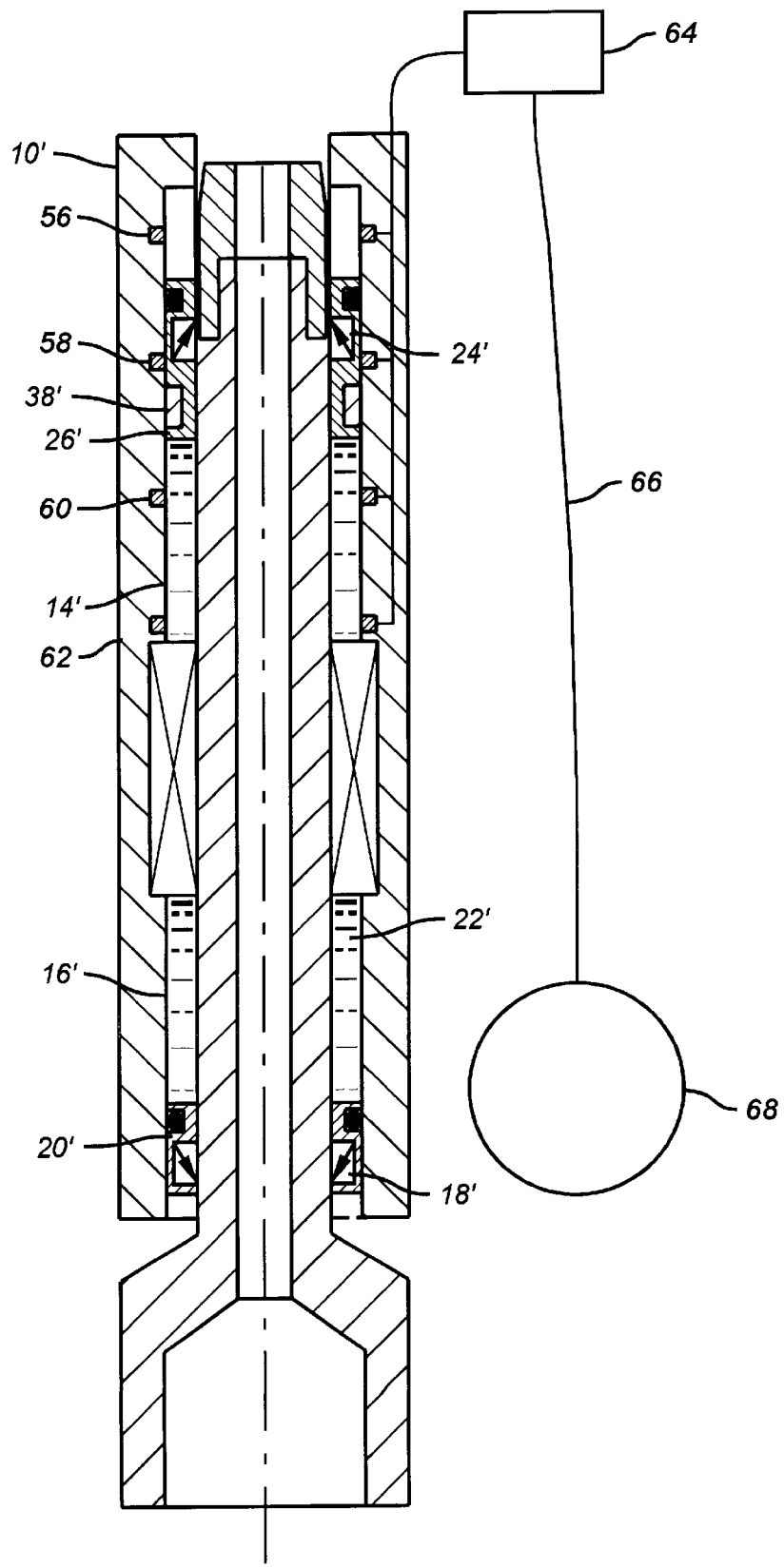
FIG. 3 is a schematic representation of a real-time technique for sensing the remaining fluid available in the reservoir during drilling operations.

The downtime involved in needlessly removing the downhole mud motor assembly is avoided by the technique and apparatus of the present invention, as illustrated in FIGS. 2 and 3. The common structures between FIGS. 1 and 2 will not again be described in great detail. Reference to similar structures will be through the use of similar numerals, with the new structures being described with other numbers. Thus, in the embodiment shown in FIG. 2, the reservoirs 14' and 16', which are in contact with the bearing assembly 12' are sealed by virtue of seals 18' and 24'. Pistons 20' and 26' are, respectively, attached to seals 18' and 24'. A signal source 38 is located adjacent seal 24'. The signal source 38 can take a variety of forms and types. For example, if the housing 10' is nonmagnetic, the signal source 38 can be magnetic and its position readily determined by a sensor 40, which is part of a hand-held receiver apparatus 42. The receiver 42 has a display 44 which indicates the closest proximity between the signal source 38 and the sensor 40. Markers 48, 50, 52, and 54 illustrate externally of the body 10' the various levels of lubricant 22' remaining in the reservoirs 14' and 16'. Those skilled in the art will appreciate that the movement of the pistons 26' and 20' is identical and in opposite directions; therefore, a reading adjacent the upper reservoir 14, which in the embodiment shown in FIG. 2 is in fluid communication with the lower reservoir 16', is a good indication of the actual fluid level of lubricant 22' in the reservoirs 14' and 16'. A duplicate assembly involving signal source 38, as well as level markers 48–54, can be employed adjacent the lower reservoir 16' without departing from the spirit of the invention.

In the alternative, the signal source 38 can have its own power supply and can emit signals through the housing 10' which can be sensed by a sensor 40. These signals include but are not limited to electrical, acoustical, radio, ultrasonic, as well as vibratory signals so that an external hand-held device, such as the receiver 42, can be employed in conjunction with level markers 48–54 to determine the true level of lubricant 22' in the reservoirs such as 14' and 16'.

Referring now to FIG. 3, in which an alternative embodiment is shown for real-time feedback of the level of lubricant 22' in the reservoirs 14' and 16', in this embodiment, the signal source 38 is movable with the piston 26'. In this embodiment, the sensors 56, 58, 60, and 62 are located within the body 10'. Each of these sensors 56, 58, 60, and 62 are wire-connected to an MWD sub 64, which is mounted physically above the downhole mud motor (not shown). From the MWD sub 64, wiring 66 extends to the surface, or other means of signal transmission to the surface such as pressure pulses or acoustical, so that a surface display 68 can indicate the level in the reservoirs 14' and 16'. In the configuration illustrated in FIG. 3 with four sensors, the level is preferably indicated at full, three-quarters, half full, quarter full, and empty. As a margin of safety, additional lubricant 22' can still exist in the reservoirs 14' and 16', even when a signal is given from sensor 62 indicating no level. Different types of techniques can be employed to transmit a position signal of the piston 26' to the surface. The signal source 38 can interact with the sensors 56–62 in various ways to indicate the proximity of piston 26' to a sensor 56–62. As one example, the interaction between the signal source 38 and one of the sensors, such as 56, can complete a circuit which, in turn, gives a display on the surface equipment 68. Alternatively, the signal source 38 can emit a magnetic field or radio waves which are detected by sensors 56–62. Other techniques for determining proximity between a piston, such as 26' and a fixed point of the piston 26' on the reservoir 14', can also be used without departing from the spirit of the invention. The advantage to the surface operator is that on a real-time basis, the position of the pistons, such as 26' and 20' can be known. The rate of movement of the pistons is also indicative of the leakage flowrate of lubricant 22 around the seals 18' and 24'. Thus, with real-time display on the display 68, surface personnel can monitor, or have monitored for them through a computing device built into the display 68, the leakage rate out of reservoirs 14' and 16'. Armed with this information, surface personnel can make rational decisions regarding unusual situations that may be occurring downhole with the seals 18' and 24' in the bearing section of the downhole mud motor system enclosed in housing 10'.

The present invention provides a reliable measurement system for the presence of lubricant 22' for the bearings 12' in an assembly for a downhole mud motor system. Given a reliable measurement technique of the lubricant level, downhole mud motor systems no longer have to be removed from service arbitrarily at about 80–120 hours of service, as has previously been done. Now, with the present invention, these systems can be run longer with the assurance that adequate level detection is possible. By having a reliable level-detection system, regardless of whether it is in a real-time basis or requires removal of the mud motor assembly, drillers can drill for longer periods with confidence and build up an experience level that will readily allow them to expand the useful life of the assembly beyond the arbitrary 80–120 hours that is now currently the rule of thumb in the field. Of course, with the use of a real-time installation, significantly greater running times can be obtained, limited only by the measured rate of penetration as it may be affected by the nature of the formation being drilled and/or the wear on the bit. These other circumstances can dictate a removal of the assembly at an appropriate time. However, the net result with using the techniques as described above for the present invention is to create confidence in a measurement system for lubricant level which will, through experience in the case of the embodiment shown in FIG. 2, and through actual real-time feedback, allow a dramatic productivity increase in the use of downhole mud motor assemblies.

The foregoing disclosure and description of the invention are illustrative and explanatory thereof, and various changes in the size, shape and materials, as well as in the details of the illustrated construction, may be made without departing from the spirit of the invention.

We claim:

1. An apparatus for use in a wellbore, outside the wellbore at the surface, for detecting the lubricant level in a sealed downhole motor bearing section lubricant reservoir in order to determine the remaining bearing life, comprising:

a body having a rotating and a stationary component;

a bearing assembly mounted to said body components;

at least one reservoir defined by said bearing assembly and said body components;

a movable piston operable between said body components;

a seal adjacent said piston;

a signal source movable with said piston;

a receiver for obtaining a signal from said signal source to allow the position of said piston to be determined.

2. The apparatus of claim 1, wherein:

said receiver is hand-held outside said stationary component and further comprises an indication when said receiver is moved in close proximity to said piston.

3. The apparatus of claim 2, wherein:

said stationary component comprises a plurality of level markers for said reservoir, whereupon the position of the piston as detected by said receiver can be compared to said level markers to determine the remaining lubricant level.

4. The apparatus of claim 3, wherein:

said signal source is magnetic;

said body components are nonmagnetic;

said receiver is magnetic so that in close proximity by said receiver to said signal source, an indication on said receiver shows the position of said piston.

5. The apparatus of claim 3, wherein:

said signal source emits an acoustical signal sensed by said receiver.

6. The apparatus of claim 3, wherein:

said signal source emits an electrical signal sensed by said receiver.

7. The apparatus of claim 3, wherein:

said signal source emits a vibratory signal sensed by said receiver.

8. The apparatus of claim 3, wherein:

said signal source emits an ultrasonic signal sensed by said receiver.

9. The apparatus of claim 1, wherein:

said receiver is mounted at least in part to said stationary component for receipt of at least one position signal from said signal source;

said receiver transmits to the surface on a real-time basis any signal received from said signal source to allow monitoring of the lubricant level in said reservoir.

10. The apparatus of claim 9, wherein:

said receiver is mounted in a plurality of locations in said stationary component of said body to allow it to receive a signal from said signal source when said piston is in different positions in said reservoir.

11. The apparatus of claim 10, wherein:

said stationary component of said body is supported in the wellbore by a tubing string with a measurement-while-drilling sub.

12. The apparatus of claim 11, wherein:

said receiver computes leakage rates of lubricant out of said reservoir by computing movement of said piston per unit time.

13. The apparatus of claim 10, wherein:

said signal source is magnetic;

said body components are nonmagnetic;

said receiver is magnetic so that in close proximity by said receiver to said signal source, an indication on said receiver shows the position of said piston.

14. The apparatus of claim 13, wherein:

said signal source emits an acoustical signal sensed by said receiver.

15. The apparatus of claim 14, wherein:

said signal source emits an electrical signal sensed by said receiver.

16. The apparatus of claim 15, wherein:

said signal source emits a vibratory signal sensed by said receiver.

17. The apparatus of claim 16, wherein:

said signal source emits an ultrasonic signal sensed by said receiver.

* * * * *